May 20, 1941.   H. J. BUTCHER ET AL   2,242,847
SLEEVE PROTECTOR FOR EARTH BORING DRILLS
Filed Sept. 8, 1939   2 Sheets-Sheet 1
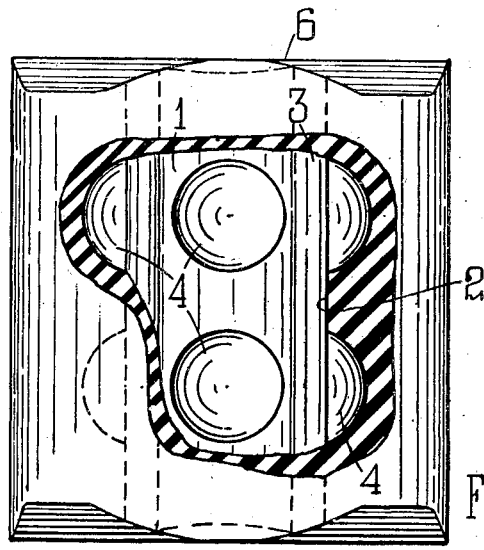
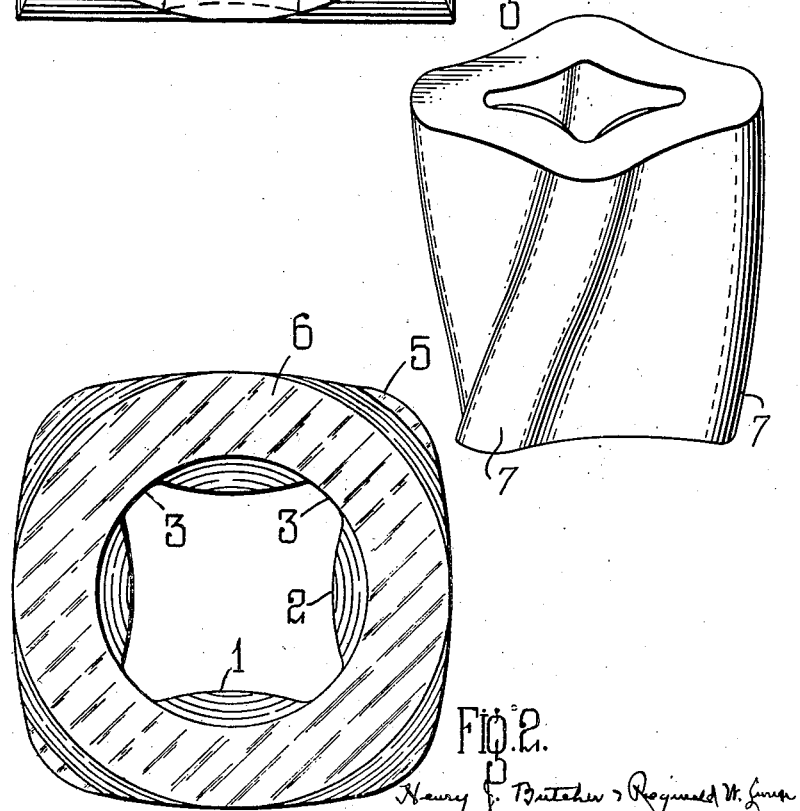

May 20, 1941.    H. J. BUTCHER ET AL    2,242,847
SLEEVE PROTECTOR FOR EARTH BORING DRILLS
Filed Sept. 8, 1939    2 Sheets-Sheet 2

Patented May 20, 1941

2,242,847

UNITED STATES PATENT OFFICE 2,242,847

SLEEVE PROTECTOR FOR EARTH BORING DRILLS

Henry James Butcher and Reginald William Lunn, Leyland, near Preston, England, assignors to The Leyland and Birmingham Rubber Company Limited, Leyland, near Preston, England, a British company Application September 8, 1939, Serial No. 294,018 In Great Britain May 19, 1939

2 Claims. (Cl. 308—4)

The present invention relates to an improved sleeve protector for earth boring drills.

In the drilling of bore holes for artesian wells or when drilling for oil, salt or the like, it is usual to apply to the spindle of the drill at spaced points along it a sleeve of rubber to stabilise this, to assist in its centering, and to prevent hammering of the drill spindle against the enclosing tube spaced from it, should the drill spindle swing round in a path not truly axial to the enclosing tube.

It has been usual to expand these rubber sleeves to about twice their normal diameter, so that they are held tightly upon the drill spindle or shaft, but it has been found that on occasions even this frictional grip is insufficient to prevent the sleeves rising, and moreover such sleeves have the disadvantage that, the whole of their material being in tension, any cut on their exterior, which is extremely likely to occur due to sharp pieces of rock or other material released by the drill bit and moving up the space between the drill shaft or spindle and the enclosing tube striking against or becoming caught between said rubber sleeve and this enclosing tube; such cuts due to the rubber being in tension tend to spread rapidly and cause a rapid disintegration of the sleeves.

According to the present invention a protector sleeve is arranged to be of differing thickness at differing points around its periphery, so that when the sleeve is uniformly expanded about its centre certain portions of its outer periphery will no longer be in tension but actually in compression, so that any cuts upon them will tend to seal up and not become exaggerated.

Figure 3:
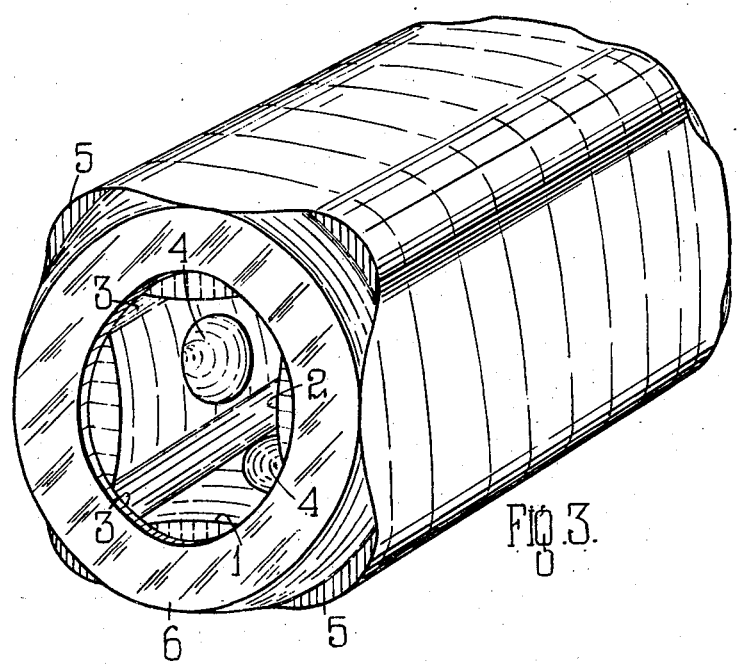
Figure 4:
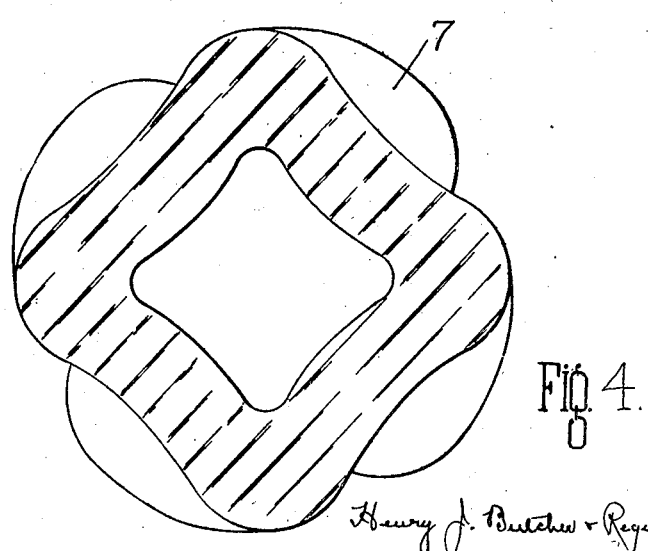

The invention is more particularly described with reference to the accompanying drawings in which:

Figure 1 is a side view of one form of construction, with a portion broken away to show part of the interior, Figure 2 is a corresponding plan view, Figure 3 is a view in perspective, Figure 4 is a plan view of a modified form of construction, Figure 5 is a corresponding perspective view.

The sleeve of the present invention has either a cylindrical outer form or a polygonal outer form such as a rectangular shape as shown in the drawings, whilst its internal form is substantially rectangular, being preferably in the form of a square having cylindrical sides 1, 2 ... with truncated edges 3. This inner surface is preferably also provided with depressions 4, forming suction cups to prevent displacement of the sleeve along the spindle on which it is mounted due to the increased adhesion of the sleeve upon the spindle by reason of these cups.

It will consequently be seen that when the sleeve is expanded over a spindle, the corners 5 will be in compression, due to the fact that the original square or roughly square opening has now been deformed into a cylinder, and therefore the rubber at the parts 6 will be under high tension, and these are the parts which lie furthest from the centre of the sleeve. Consequently any cuts at the corners 5, due to sharp flints or stones or other material passing up between the central boring spindle and the outer tube, will not tend to spread but rather to close up.

In the arrangement shown, the internal shape of the sleeve is shown rectangular, but obviously this may be either triangular or polygonal in each case the sides being preferably part cylindrical surfaces convex to the interior as at 1, 2, joined by short cylindrical portions concave to the interior as at 3, whereby the sleeve when subject to stress by stretching over the drill spindle or shaft in known manner will present a sleeve roughly cylindrical upon its outside surface but presenting in the arrangement shown four convex ribs on this exterior surface, the rubber of which will be in compression and will be the chief parts of the external surface of the sleeve which will be subject to wear and tear.

Instead of these ribs 5 lying axially of the sleeve they may be ranged spirally, as shown at 7, Figures 4 and 5.

It is to be clearly understood that minor changes in the details of construction and arrangement of parts may be made without departing from the scope of the invention as set forth in the appended claims.

We declare that what we claim is:

1. A sleeve protector for earth boring drills made of rubber and having an internal opening bounded by convex cylindrical sides joined by short concave portions, the portions radially outside the convex sides being in tension whilst the portions radially outside the concave portions are in compression when the sleeve is stretched over a drill shaft of circular cross-section.

2. A sleeve protector for earth boring drills made of rubber and having an internal opening bounded by convex cylindrical sides joined by short concave portions and having a roughly rectangular exterior, the portions radially outside the convex sides being in tension whilst the portions radially outside the concave portions are in compression when the sleeve is stretched over a drill shaft of circular cross-section.

HENRY JAMES BUTCHER.
R. W. LUNN.